United States Patent [19]
Okuda et al.

[11] Patent Number: 5,645,503
[45] Date of Patent: Jul. 8, 1997

[54] POWER TRANSMISSION CHAIN HAVING A SPRING LINK

[75] Inventors: Tomonori Okuda, Nabari, Japan; John C. Skurka, Brooktondale, N.Y.

[73] Assignees: Borg-Warner Automotive, K.K., Nabari, Japan; Borg-Warner Automotive, Inc., Sterling Heights, Mich.

[21] Appl. No.: 523,520

[22] Filed: Aug. 31, 1995

[30] Foreign Application Priority Data

Sep. 2, 1994 [JP] Japan .................... 6-234073

[51] Int. Cl.$^6$ ............................ F16G 13/04
[52] U.S. Cl. ............................ 474/214
[58] Field of Search ............ 474/206, 212–214, 474/244, 245, 247

[56] References Cited

U.S. PATENT DOCUMENTS

| | | | |
|---|---|---|---|
| 5,007,883 | 4/1991 | Cole, Jr. et al. | 474/245 |
| 5,026,332 | 6/1991 | Mott et al. | 474/245 X |
| 5,061,226 | 10/1991 | Mott | 474/244 |
| 5,090,948 | 2/1992 | Orth | 474/245 |
| 5,114,384 | 5/1992 | Tsuyama | 474/220 X |
| 5,167,587 | 12/1992 | Mott | 474/245 |
| 5,176,584 | 1/1993 | Ishida et al. | 474/214 X |
| 5,263,903 | 11/1993 | Mott | 474/214 X |
| 5,318,485 | 6/1994 | Bateman | 474/245 |

FOREIGN PATENT DOCUMENTS

5-34936   6/1993   Japan .

*Primary Examiner*—Roger J. Schoeppel
*Attorney, Agent, or Firm*—Hugh A. Abrams, Esq.; Greg Dziegielewski

[57] ABSTRACT

A power transmission chain with a spring link of improved durability. The chain includes a plurality of link plates. Each of the links has a pair of pinholes. The links are interleaved and are connected by rocker joints inserted in the pinholes. Guide links are placed at the outermost sides of the inner links. A spring link with a pair of pinholes formed in it is placed between adjacent link plates. The link plate contacting parts at both ends of spring link are located outside of the link apertures. The spring links may also be placed in the chain in two different orientations.

4 Claims, 2 Drawing Sheets

POWER TRANSMISSION CHAIN HAVING A SPRING LINK

BACKGROUND OF THE INVENTION

This invention relates to a silent or inverted tooth chain for transmitting power in an automobile, motorcycle or other vehicle. More specifically, this invention relates to a power transmission chain having a large number of interleaved links. The links are arranged in rows or sets and connected by connecting pins. Guide links are located at the outermost sides of alternate sets of links. Spring links are included in some rows or sets of links.

In conventional silent chains used as a power transmission chain for automobiles and motorcycles, spring links are typically used for reduction of chordal vibration of the chain and reduction of the chain noise. An example of a conventional chain of the prior art is shown in FIGS. 4 and 5. In this chain, a large number of inverted tooth links or link plates 51 are interleaved in rows by connecting pins 52. Guide links or guide plates 53 are located at the outermost sides of alternate sets of links. The inverted tooth links are constructed and arranged to articulate with respect to one another, and transmit power, as the chain passes over the sprockets. The guide links act to maintain the chain on the sprockets.

Additionally, spring link 54 is located or sandwiched between one guide plate 53 and its adjacent link plate 51. Spring link 54 has one pair of apertures or pinholes 54a for insertion of connecting pins, as shown in FIG. 5, and its center portion is pressed against the guide plate 53 while both of its ends are pressed against the link plate 51. As the links move around the sprockets and articulate with respect to one another, friction occurs between adjacent link plates 51 and the bending resistance of the chain is increased because of the elastic repulsive force of this spring link 54. As a result, the chordal vibration of the chain is reduced or suppressed.

In this conventional silent chain, the guide plate contacting parts at both ends of spring link 54 contact the edge of aperture 54a, as shown in the cross-hatched part D of FIG. 5(a) and the circled location D' of FIG. 5(b). Therefore, the aperture or pinhole edge that intersects the cross-hatched part D tends to become the point of origin of fatigue, which decreases the durability of the spring link.

Other examples of power transmission chains with spring links are found in U.S. Pat. No. 5,090,948 (particularly FIG. 16), U.S. Pat. No. 5,167,587 (particularly FIG. 16), and U.S. Pat. No. 5,007,883 (particularly FIGS. 14–16), each of which is incorporated herein by reference.

The present invention is directed to the above-described problems in the conventional chains, and offers a power transmission chain that further improves the durability of the spring link.

SUMMARY OF THE INVENTION

This invention is concerned with a power transmission chain in which a plurality of link plates, each having pair of apertures or pinholes in each link plate, are connected into rows or sets of links by connecting pins inserted in the pinholes. Guide links are located on the outermost sides of some of the sets of links. In one embodiment, the power transmission chain of the present invention has a spring link that includes a pair of apertures for insertion of the connecting pins. The spring link is placed in the sets of links between a guide link and an inner link or between adjacent inner links. Additionally, the spring link contacts or presses against the guide link or inner link at both ends of the spring link at the outside of the apertures of the spring link. By having the spring link contact the guide link or inner link at both ends of the spring link outside of the aperture edges, the durability of the spring link is improved by altering the location of the point of origin of fatigue of the spring link. In one embodiment, the orientations of the spring links are reversed in alternate rows in order to allow a longer spring link without interference with the neighboring spring link.

DETAILED DESCRIPTION OF THE PREFERRED EMBODIMENTS

Figure 1:
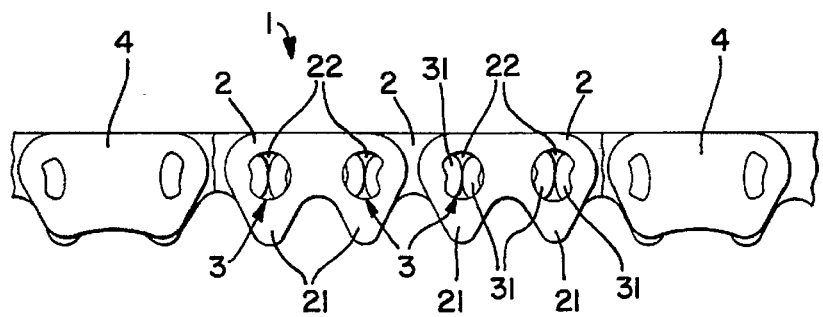
FIG. 1 is a front view of a portion of a silent chain incorporating one embodiment of the present invention.
Figure 2:
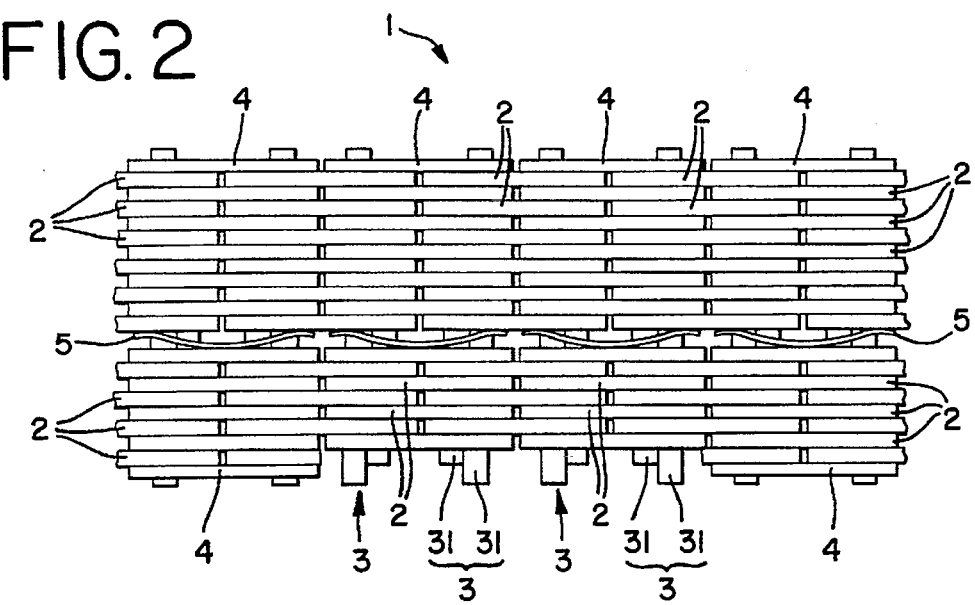
FIG. 2 is a top view of the silent chain of FIG. 1.

Turning now to the drawings, as shown in FIGS. 1 and 2, silent chain 1 has a plurality of link plates 2, each of which has a pair of inverted teeth 21 and a pair of apertures or pinholes 22. The links are interleaved in sets or rows of links and the link plates 2 are pivotally connected by inserting rocker joints 3 into the apertures. Each rocker joint includes a pair of long and short rocker pins. Guide links or guide plates 4 are located at the outermost sides of the rows of link plates 2.

Figure 3A:
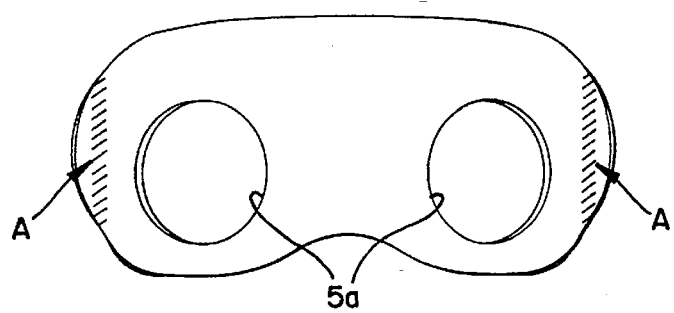
FIG. 3(a) is a front view of the spring link of the silent chain.
Figure 3B:
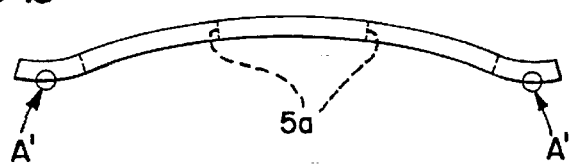
FIG. 3(b) is a top view.

Spring link 5, shown in FIG. 3, is inserted 5 in the compressed state at about the center in the width direction of silent chain 1. Spring link 5 is a wavy-form member and has a pair of apertures or pinholes 5a for insertion of rocker joint. The center part of spring link 5 is in pressure contact with the center part of opposing link plate 2 and both of its ends are in pressure contact with the center parts of two opposing link plates 2, 2. Frictional force is generated between adjacent link plates 2, 2 due to the elastic repulsive force of spring link 5 in the chain width direction. Accordingly, the bending resistance of the chain is increased and, as a result, the chordal vibration of the chain increases and the noise of the power transmission chain is reduced.

The link plate contacting parts, or portions of the spring link that maintain pressure contact with the inner links, are located at both ends of spring link 5 toward the ends of the spring link 5. The contacting parts are located outside the edge of pinhole 5a, as shown in cross-hatched part A in FIG. 3(a) and circle-marked part A' in FIG. 3(b).

Figure 4:
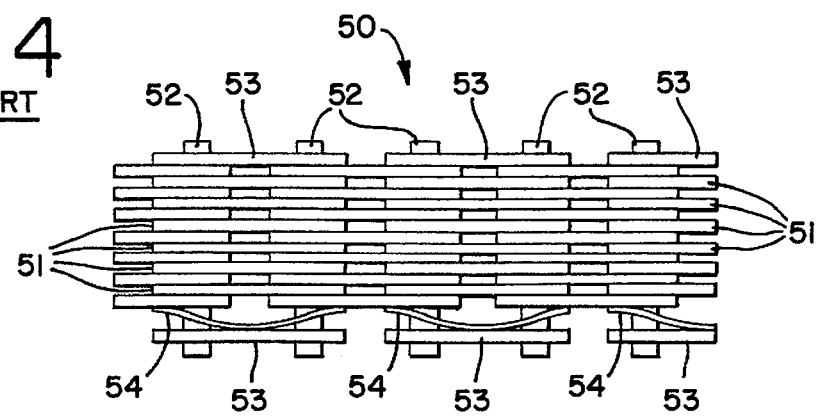
FIG. 4 is a conventional silent chain of the prior art.
Figure 5A:
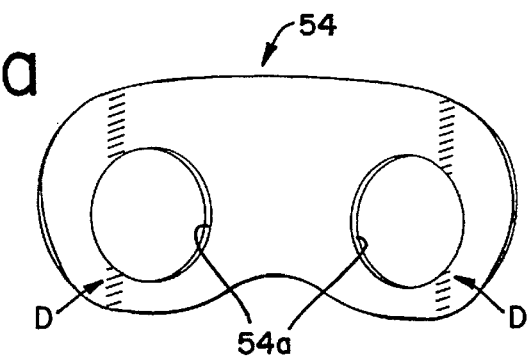
FIG. 5(a) is a front view of the spring link of the conventional silent chain of FIG. 4
Figure 5B:
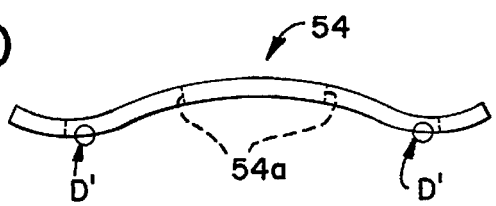
FIG. 5(b) is a top view.

Therefore, the number of locations where fatigue can originate is reduced and the durability of spring link 5 is improved. Also, the outside location of the link plate contacting part of spring link 5 from the pinhole edge increases the area of link plate contacting part to reduce surface pressure acting on spring link 5, so that the wear of spring link 5 is reduced. Incidentally, spring link 5 is placed between adjacent link plates 2, 2 in the above-described embodiment, but this invention can be similarly applied to the placement of spring link 5 between link plate 2 and guide plate 4, as shown in the conventional chain of FIG. 4.

Figure 6:
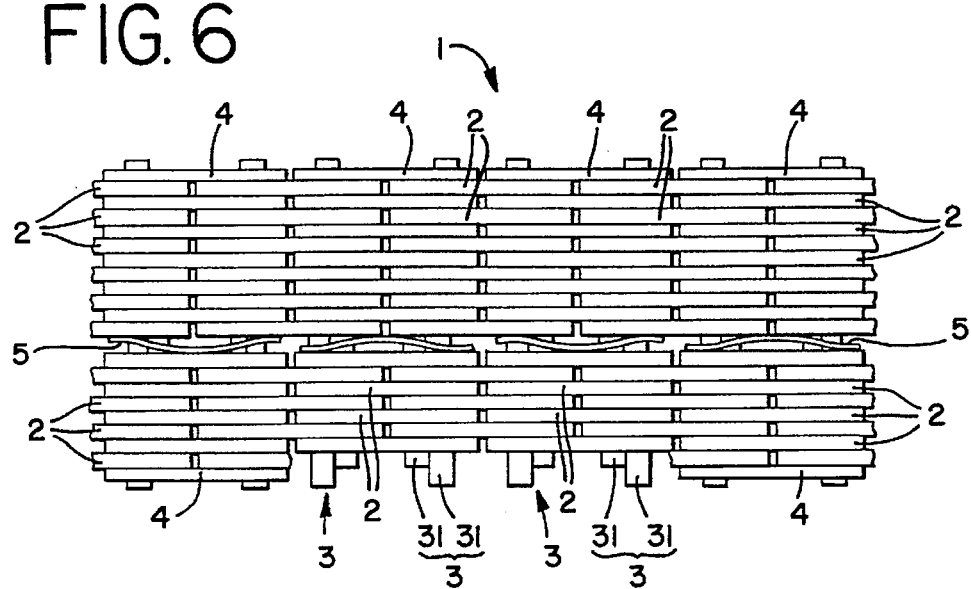
FIG. 6 is a top view of an alternate embodiment of the present invention.

In the embodiment of FIG. 2, the spring link has the same orientation in each of the rows of links. Alternatively, as shown in FIG. 6, the orientation of the spring link may be reversed and alternated in every other spring link row. That is, the spring links are located in a sequence wherein the link is in the first orientation in the first row and then in the reverse orientation in the next row and then in the first orientation in the next row and so forth. As shown in FIG. 6, the spring links are only placed in alternate rows of the chain, and then in alternate orientation in alternate rows. In this manner, the spring links avoid contact with one another as the links spread out or lengthen in the longitudinal direction of the chain as a result of the pressure on the spring links from adjacent links in each spring link row.

In the above-described embodiments, this invention is applied to a rocker joint-type silent chain. This invention can also be applied to the silent chain that uses round pins instead of rocker joints. Furthermore, this invention can be similarly applied to a random chain or CVT (Continuously Variable Transmission) chain (see Japanese Laid-Open Patent Heisei 1-145447).

As explained above, in operation, guide plate contacting parts or link plate contacting parts of the spring link are located outside of the pinholes of the spring link at both ends of the spring link. In this manner, the durability of the spring link is improved.

What is claimed is:

1. A power transmission chain comprising, a plurality of inner links interleaved in rows of adjacent links, each of said inner links having a pair of apertures, said inner links being connected by connecting pins inserted in said apertures, guide links located on the outermost sides of some of said rows of inner links; and, a plurality of spring links, each of said spring links having a pair of apertures for insertion of said connecting pins, said spring links being located between said guide links and said inner links, said spring links having a plurality of contacting portions in contact with said guide links and said inner links, two of said contacting portions being located at opposite ends of said spring link at a position outside of said apertures.

2. The power transmission chain of claim 1 wherein said spring links are placed in some rows of said chain links in a first orientation and in other rows of said chain links in a reverse orientation, said some rows of links having spring links alternating with said other rows of links having spring links.

3. A power transmission chain comprising, a plurality of inner links interleaved in rows of adjacent links, each of said inner links having a pair of apertures, said inner links being connected by connecting pins inserted in said apertures, guide links located on the outermost sides of some of said rows of inner links; and, a plurality of spring links, each of said spring links having a pair of apertures for insertion of said connecting pins, said spring links being located between said inner links, said spring links having a plurality of contacting portions in contact with said inner links, two of said contacting portions being located at opposite ends of said spring link at a position outside of said apertures.

4. The power transmission chain of claim 3 wherein said spring links are placed in some rows of said chain links in a first orientation and in other rows of said chain links in a reverse orientation, said some rows of links having spring links alternating with said other rows of links having spring links.

* * * * *